(12) United States Patent
Tuxen et al.

(10) Patent No.: US 12,042,698 B2
(45) Date of Patent: Jul. 23, 2024

(54) SYSTEMS AND METHODS FOR MEASURING A TOPPLING FREQUENCY

(71) Applicant: TRACKMAN A/S, Vedbaek (DK)

(72) Inventors: Fredrik Tuxen, Horsholm (DK);
Michael Ungstrup, Vedbaek (DK);
Kasper Mackeprang, Vedbaek (DK)

(73) Assignee: TRACKMAN A/S, Vedbaek (DK)

( * ) Notice: Subject to any disclaimer, the term of this patent is extended or adjusted under 35 U.S.C. 154(b) by 1286 days.

(21) Appl. No.: 16/293,366

(22) Filed: Mar. 5, 2019

(65) Prior Publication Data

US 2019/0282854 A1  Sep. 19, 2019

Related U.S. Application Data

(60) Provisional application No. 62/642,369, filed on Mar. 13, 2018.

(51) Int. Cl.
| | | |
|---|---|---|
| *A63B 24/00* | (2006.01) | |
| *A63B 69/36* | (2006.01) | |
| *G01S 7/35* | (2006.01) | |
| *G01S 13/58* | (2006.01) | |
| *G01S 13/88* | (2006.01) | |

(52) U.S. Cl.
CPC ...... *A63B 24/0021* (2013.01); *A63B 69/3658* (2013.01); *G01S 13/58* (2013.01); *G01S 13/583* (2013.01); *G01S 13/88* (2013.01); *A63B 2024/0034* (2013.01); *A63B 2220/35* (2013.01); *G01S 7/356* (2021.05)

(58) Field of Classification Search
None
See application file for complete search history.

(56) References Cited

U.S. PATENT DOCUMENTS

| | | | |
|---|---|---|---|
| 6,244,971 B1 | 6/2001 | Mihran | |
| 10,850,179 B2 * | 12/2020 | Tuxen | ............... A63B 69/3658 |
| 2007/0293331 A1 | 12/2007 | Tuxen | |
| 2008/0021651 A1 | 1/2008 | Seeley et al. | |
| 2014/0191896 A1 | 7/2014 | Johnson et al. | |

(Continued)

FOREIGN PATENT DOCUMENTS

| | | |
|---|---|---|
| CN | 1928589 | 3/2007 |
| CN | 101057158 | 10/2007 |

(Continued)

OTHER PUBLICATIONS

Chen et al, "Micro-Doppler effect in radar: phenomenon, model, and simulation study", IEEE Transactions on Aerospace and Electronic Sysystems, IEEE Service Center, vol. 42, No. 1, Jan. 2006, p. 2-21.

(Continued)

*Primary Examiner* — Reginald A Renwick

(74) *Attorney, Agent, or Firm* — Fay Kaplun & Marcin, LLP

(57) ABSTRACT

A system includes a radar configured to capture radar data of a non-spherical object. The system also includes a processor configured to detect, in the radar data, oscillations corresponding to rotation of the object about an axis that is not an axis of symmetry of the object and determine a frequency of the rotation of the object about the axis based on the detected oscillations.

18 Claims, 9 Drawing Sheets

(56) References Cited

U.S. PATENT DOCUMENTS

| 2016/0067581 | A1* | 3/2016 | Tuxen | G01S 13/58 |
| | | | | 473/152 |
| 2016/0306035 | A1 | 10/2016 | Johnson | |
| 2017/0054950 | A1* | 2/2017 | Yeo | G01S 13/88 |
| 2017/0254892 | A1 | 9/2017 | Tuxen | |

FOREIGN PATENT DOCUMENTS

| CN | 101384308 | 3/2009 |
| CN | 103913736 | 7/2014 |
| CN | 106872980 | 6/2017 |
| GB | 2380682 | 4/2003 |
| JP | 3870233 | 1/2007 |
| JP | 2012068139 | 4/2012 |
| WO | 2005116678 | 12/2005 |
| WO | 2010/086414 | 8/2010 |
| WO | 2015084928 | 6/2015 |

OTHER PUBLICATIONS

Walton, "The use of high speed FIFO chips for implementation of a noise radar", Radar Symposium (IRS) 2010 11$^{th}$ International, Jun. 2010, p. 1-4.

Chen, "Micro-Doppler effect of micromotion dynamics: a review", Proceedings of SPIE Medical Imaging 1997, vol. 5102, Apr. 2003, p. 240-249.

\* cited by examiner

SYSTEMS AND METHODS FOR MEASURING A TOPPLING FREQUENCY

PRIORITY CLAIM

This application claims priority to U.S. Provisional Patent Application Ser. No. 62/642,369 filed Mar. 13, 2018. The specification of the above-identified application is incorporated herewith by reference.

BACKGROUND

Spin parameters, such as a spin rate of a spherically-shaped sports ball, are highly useful for tracking a launch of the sports ball and providing metrics related to the launch to interested parties. Determining the spin rate of a spherical sports ball is described in the art, for example, in U.S. Pat. No. 8,845,442. However, a non-spherically-shaped sports ball may have multiple independent spin parameters, making the derivation of spin metrics more difficult. It is not presently known in the art how to determine a spin rate of a non-spherical ball when the spin changes the apparent orientation of the ball, i.e., causes the ball to "topple." An example of a toppling spin is a typical kick in American football, where the football almost always has a portion of "over the top," i.e., "toppling," rotation. A determination of the toppling frequency for kicks in American football is highly relevant for determining the factors that influence the flight of the kicked ball. Kickers often refer to the toppling frequency from visual inspection of the flight and use this as one of the criteria for determining if the kick was successfully executed or not.

SUMMARY

The present invention relates to a method to determine a toppling frequency of an object by generating a signal corresponding to the change of the apparent size of the ball over time. This signal is then analyzed for a time periodic behavior in either the frequency of time domain. The toppling frequency is derived from the determined time period.

The preferred embodiment to determine the change in apparent size of the non-spherical ball is based on analyzing the time varying Doppler signal received by a Doppler radar from a rotating non-spherical ball during a portion of its flight. Due to rotation of the non-spherical ball the Doppler broadening bandwidth of the rotating ball will change over time. A corresponding signal over time can be generated representing the bandwidth, the upper and/or lower frequency contour. Also, the signal strength, the center Doppler frequency shift and corresponding phase information of the received signal from the rotating non-spherical sports ball will change periodically over time and can be used for generating a corresponding signal. The signal is analyzed for a time periodic behavior in either the frequency or time domain. The toppling frequency is derived from the determined time period.

In an alternative embodiment the change in apparent size of the ball over time is determined from multiple images captured by an imager and determining the size of the ball in pixels over time and generating a corresponding signal. This signal will be slowly decaying if the ball is moving away from the imager but will have a periodic oscillation corresponding to the toppling of the ball. Also, in this embodiment the signal is analyzed for a time periodic behavior in either the frequency or time domain. The toppling frequency is derived from the determined time period.

The present invention also relates to a system which includes a radar configured to capture radar data of a non-spherical object. In addition, the system includes a processor configured to detect, in the radar data, oscillations corresponding to rotation of the object about an axis that is not an axis of symmetry of the object and determine a frequency of the rotation of the object about the axis based on the detected oscillations.

In addition, the present invention relates to a method which includes generating, by an imager, a plurality of images of a non-spherical object as the object rotates about an axis that is not an axis of symmetry of the object; determining, in each of the plurality of images, a size of a portion of the image representing the object; and determining a frequency of rotation of the object about the axis based on the sizes of the portions of the images representing the object over time.

Furthermore, the present invention relates to a method which receiving, by a sensor, data corresponding to rotation of a non-spherical object about an axis that is not an axis of symmetry of the object; detecting, in the data, oscillations corresponding to the rotation of the object about the axis; and determining a frequency of the rotation of the object about the axis based on the detected oscillations.

BRIEF DESCRIPTION

DETAILED DESCRIPTION

Figure 1:
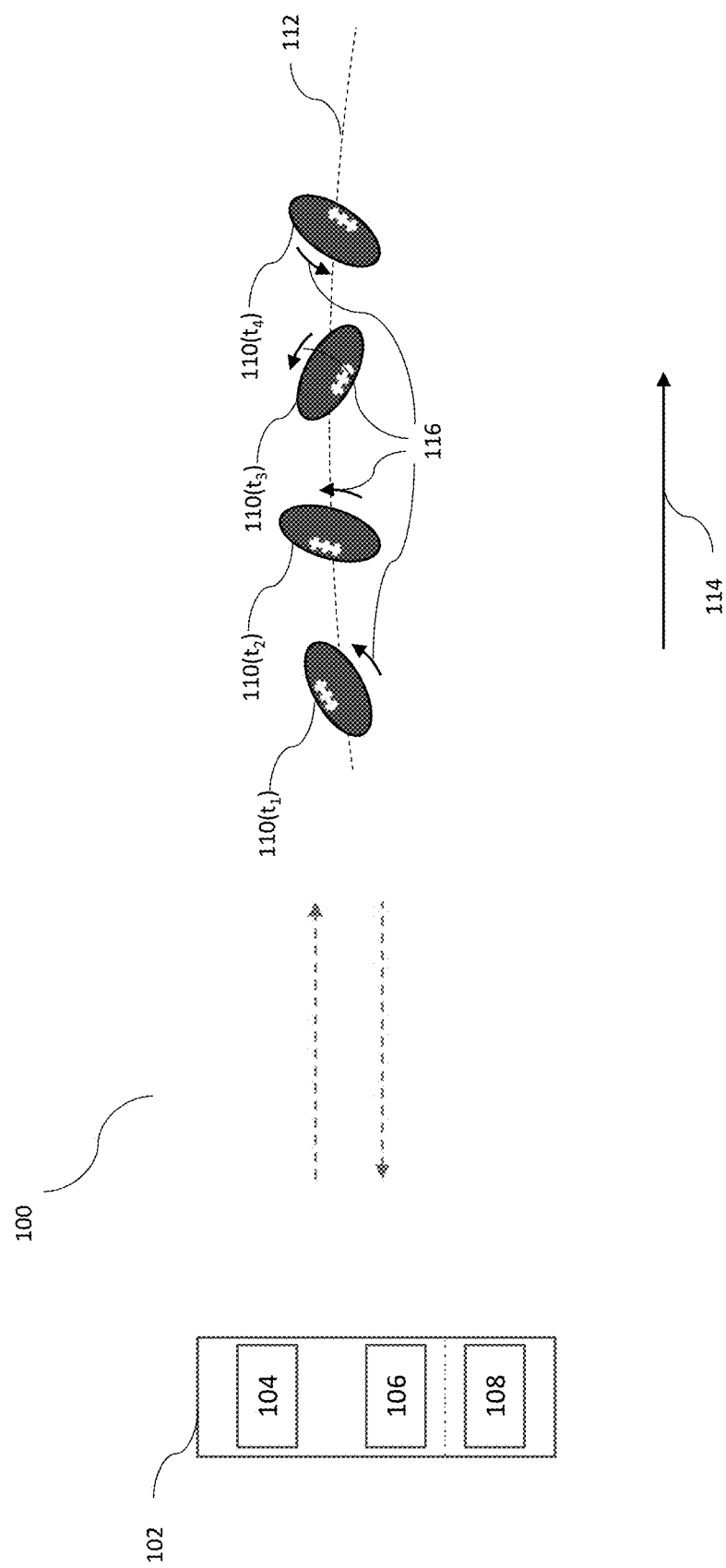
FIG. 1 shows a radar system for determining a toppling frequency of a rotating spheroid ball according to a first exemplary embodiment of the present invention.

The exemplary embodiments may be further understood with reference to the following description and the related appended drawings, wherein like elements are provided with the same reference numerals. The exemplary embodiments relate to a system and method for measuring a toppling frequency of a moving non-spherical sports ball while in flight. In the following, sports balls are divided into two general types of sports ball shapes; the spherical ball (e.g., golf ball, football (soccer ball), tennis ball, baseball, etc.) and the non-spherical, typically ellipsoid-like-shaped ball, otherwise known as a spheroid ball (e.g., American football, Australian football, rugby ball, etc.). Small modifications to the ball such as the seams on a baseball and the dimples on a golf ball that cause these generally spherical balls to deviate from a perfect sphere are not considered to substantially affect the general overall shape of the balls, which are still considered spherical for the purposes of this analysis. We will also in the following restrict ourselves to the discussion of oblate spheroids and prolate spheroids, i.e., spheroids comprising three orthogonal symmetry axes where two of the three axes, B and C, are of equal length ($2b$ and $2c$ respectively), and the third axis, A, is either shorter or longer (with length $2a$) respectively, than the other two. An American football is an example of a prolate spheroid. This restriction should not be seen as a limitation of the exemplary embodiments, but should rather serve as a way to more easily illustrate the current invention. While most sports balls may be described by these two shapes, the following disclosure should not be viewed as a limitation of the current invention to cover only these types of balls, but rather should serve as an illustration of the practical application of the current invention to these types of balls. Although exemplary embodiments detailed herein describe the tracking of American footballs, those skilled in the art will understand that any non-spherical sports ball or even non-sports related non-spherical objects may be tracked in the same manner.

Figure 2:
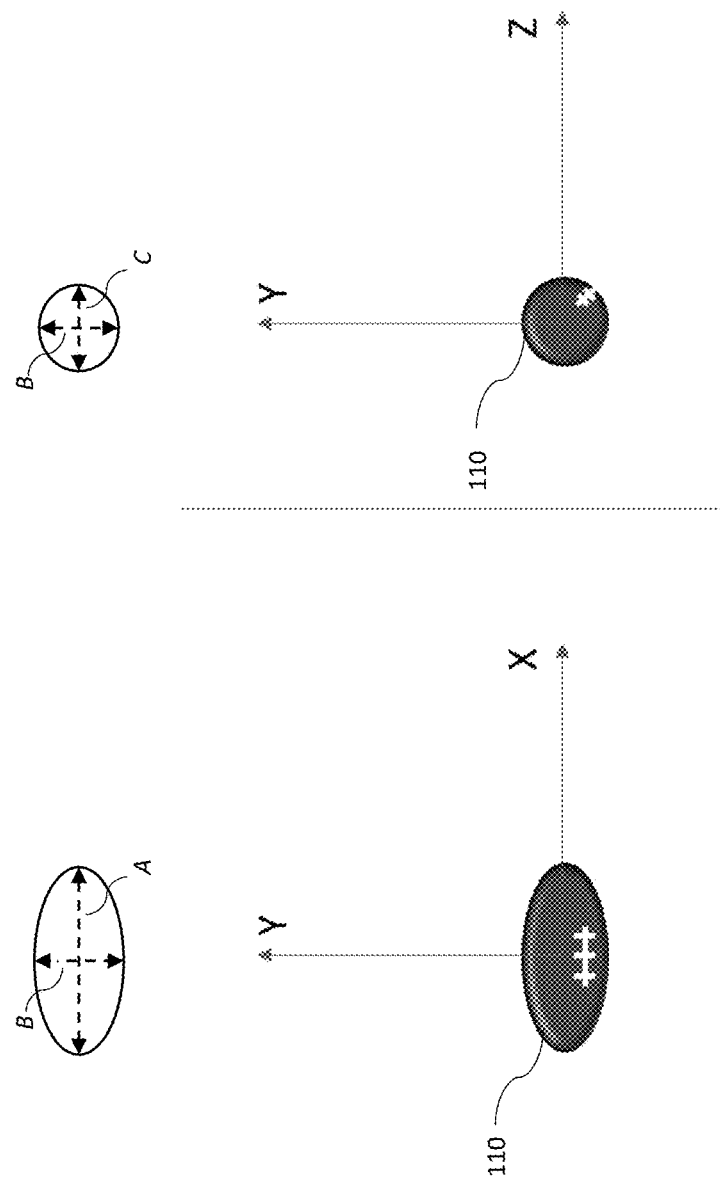
FIG. 2 shows the rotating spheroid ball of the exemplary system of FIG. 1.

A spheroid ball, e.g., an American football, has two independent types of rotation. These two types of rotation may be denoted as "spin" and "toppling." Spin is defined as rotation of the spheroid ball about the symmetry axis, A, which passes through the center of mass of the ball and leaves the apparent orientation of the ball substantially unchanged as the ball spins. In practice, features such as seams and laces on an otherwise spheroid football will cause the center of mass of the football to lie at a point that is slightly off of an axis of geometric symmetry. Thus, the symmetry axis of the football may not be perfectly coincident with the spin axis of the football. However, this is generally relevant only to a rifle spin (or spiral) and does not significantly impact the analysis of the type of end over end toppling about an axis other than the spin axis passing through the center of mass addressed in this application. In FIG. 2, for example, this spin axis of the ball 110 is its X-axis. For a spherical ball, e.g. a golf ball, the spin axis is not restricted to a specific orientation of the ball. The apparent orientation of a spherical ball remains the same regardless of the axis about which it is rotating. Various methods for the determination of a spin frequency for a spherical ball, i.e. a frequency of rotation about the spin axis, are known in the prior art (see, e.g., U.S. Pat. No. 8,845, 442B2) and will not be discussed in further detail here.

Toppling is defined as the rotation of the ball about any axis that is not the spin axis. This axis is referred to herein as the toppling axis. In situations where the ball experiences rotation only about the A-axis, i.e., the spin axis, it may be considered that the ball is unaffected by toppling, i.e., it does not topple. In the case of the spheroid ball 110 illustrated in FIG. 2, toppling is the rotation of the A-axis of the ball 110 about a toppling axis, which can take any orientation. A toppling frequency, or toppling rate, of a ball may be defined as a frequency of a rotation of the ball about the toppling axis. The present disclosure is directed to a novel method for determining the toppling frequency of a non-spherical ball. Toppling is a feature unique to non-spherical balls, considering spherical balls have a uniform orientation with respect to the shape of the ball.

FIG. 1 shows a radar system 100 for determining a toppling frequency of a rotating spheroid ball 110 according to a first exemplary embodiment of the present invention. The system 100 includes a radar device 102 aimed in a direction 114 encompassing in its field of view an area into which a spheroid ball 110 is to be projected toward during at least a part of its flight along a flight path 112. The direction 114 may be toward a target area at which the spheroid ball 110 is being aimed. The radar device 102, in this exemplary embodiment, includes a single transmitter 104 and a single receiver 106. However, the radar device 102 may comprise multiple transmitters and multiple receivers for increasing the accuracy of the toppling frequency determination. The radar device 102 further includes a processor 108 which may be an integral part of the radar system or may be a separate processor connected to the radar device 102 via, for example, a wired or wireless connection, as would be understood by those skilled in the art. In a further embodiment, the processor 108 may include a computer associated with the radar device 102.

The radar device 102 may be, for example, a continuous wave (CW) Doppler radar emitting microwaves at an X-band frequency (10 GHz) at a power of up to 500 milliWatts EIRP (Equivalent Isotropic Radiated Power), thus being compliant with FCC and CE regulations for short range international radiators. However, in other jurisdictions, other power levels and frequencies may be used in compliance with local regulations. In an exemplary embodiment, microwaves are emitted at a higher frequency between, for example, 5-125 GHz. For more precise measurements at lower object speeds frequencies of 20 GHz or higher may be used. Any type of CW Doppler radar may be used, including phase or frequency modulated CW radar, multi frequency CW radar or a single frequency CW radar.

It will be understood that other tracking devices such as lidar may be used with radiation in either the visible or non-visible frequency region. Current pulsed radar systems are limited in their ability to track objects close to the radar device. However, the distance an object must be from these pulsed radar systems to be successfully tracked has decreased over time and is expected to continue to decrease. Thus, these types of radar may soon be effective for these operations and their use in the systems of the invention described below is contemplated. Throughout the application, the tracking of objects is described based on the use of Doppler frequency spectrums. As would be understood by a person skilled in the art, these Doppler frequency spectrums refer to the data from CW Doppler radar. If a pulse-Doppler radar is used a similar Doppler frequency spectrum can be generated and similar method applied. Any other type of radar or lidar capable of generating a Doppler frequency spectrum may also be used.

In the embodiment of FIG. 1, the system 100 is a radar system for determining a toppling frequency of a rotating spheroid ball 110, e.g., an American football, projected from a launch position toward a target area. The spheroid ball may be thrown, kicked, or otherwise launched from the launch position. As is understood by those skilled in the art, the target area does not need to be any specially created area and the launch position may be any location within or outside the field of view of the radar 102. FIG. 1 shows an orientation of the spheroid ball 110 at four non-overlapping times, $t_1$, $t_2$, $t_3$, and $t_4$, as the spheroid ball 110 travels in a translational velocity direction 114. As is clear in FIG. 1, the spheroid ball 110 is rotating in a direction 116 about an axis that is not parallel to the major A-axis of the spheroid ball 110, i.e., the X-axis shown in FIG. 2. The radar 102 tracks the spheroid ball 110 as it is launched from the launch location (if the launch location is within the field of view of the radar 102)

or when the spheroid ball 110 enters the field of view of the radar 102 and travels along the flight path 112. As the spheroid ball 110 moves, radar waves transmitted by the transmitter 104 of the radar 102 are reflected from the spheroid ball 110 and are received by the receiver 106 of the radar 102. As understood by those skilled in the art, a Doppler radar transmits a radar wave, receives a reflected radar wave, and measures a frequency of the reflected wave. The difference between the frequency of the reflected wave and a frequency of the transmitted wave is called a Doppler shift. The Doppler shift is proportional to the velocity of the reflected object relative to the radar.

When the spheroid ball 110 is affected by toppling, different parts of the spheroid ball 110 will have different speeds relative to the radar, causing a Doppler broadening of the reflected signal from the spheroid ball 110. That is, a range of frequency differences will be detected as the velocity of different portions of the ball 110 relative to the radar will vary as some parts of the ball 110 spin toward the radar (reducing the relative velocity and, consequently, the frequency difference) while other portions of the ball 110 spin away from the radar. The bandwidth of the Doppler broadening is proportional to a rate of rotation and an effective radius, $r_{eff}$, of the spheroid ball 110 at a given point in time, where the effective radius, $r_{eff}$, is defined as a maximum distance of the rotating ball from the center of the rotation as seen from the radar. In other words, $r_{eff}$ is the maximum distance of the rotating ball from the center of the ball relative to the line of sight of the radar to the ball, i.e., projected into a plane perpendicular to the line of sight from the radar to the ball.

Figure 3:
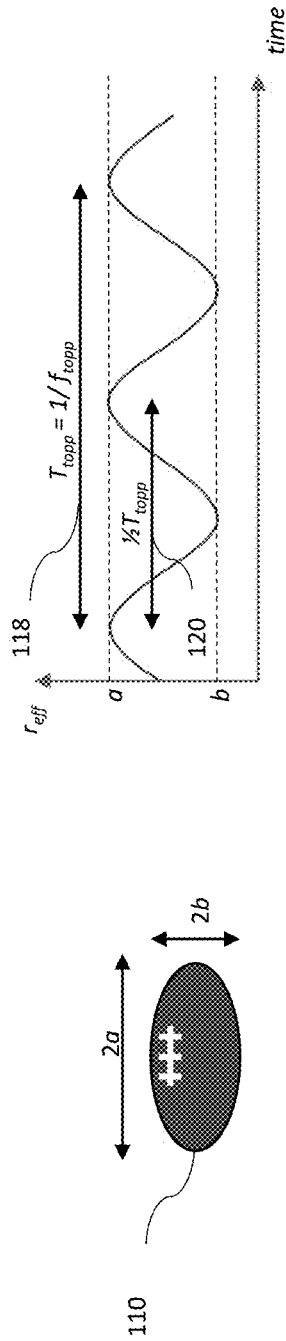
FIG. 3 shows a graph illustrating a change in an effective radius of the rotating spheroid ball of the exemplary system of FIG. 1, relative to the receiver of the radar device.

FIG. 3 shows a graph illustrating a change in an effective radius of the rotating spheroid ball 110 of the exemplary system 100 of FIG. 1, relative to the receiver 106 of the radar device 102. As may be seen in FIG. 3, a first semi-radius of the ball 110 may be defined as "a" and a second semi-radius of the ball 110 may be defined as "b," with corresponding semi-diameters having lengths of 2a and 2b. For a toppling ball, the effective radius changes periodically. A toppling period 118, $T_{topp}$, may be defined as a time required for a full revolution of the spheroid ball 110 about the toppling axis. The toppling period 118 is shown as two half-waves of period 120 in the graph of FIG. 3, as the spheroid ball 110 appears the same size for every half revolution of the ball around the toppling axis.

Figure 4:
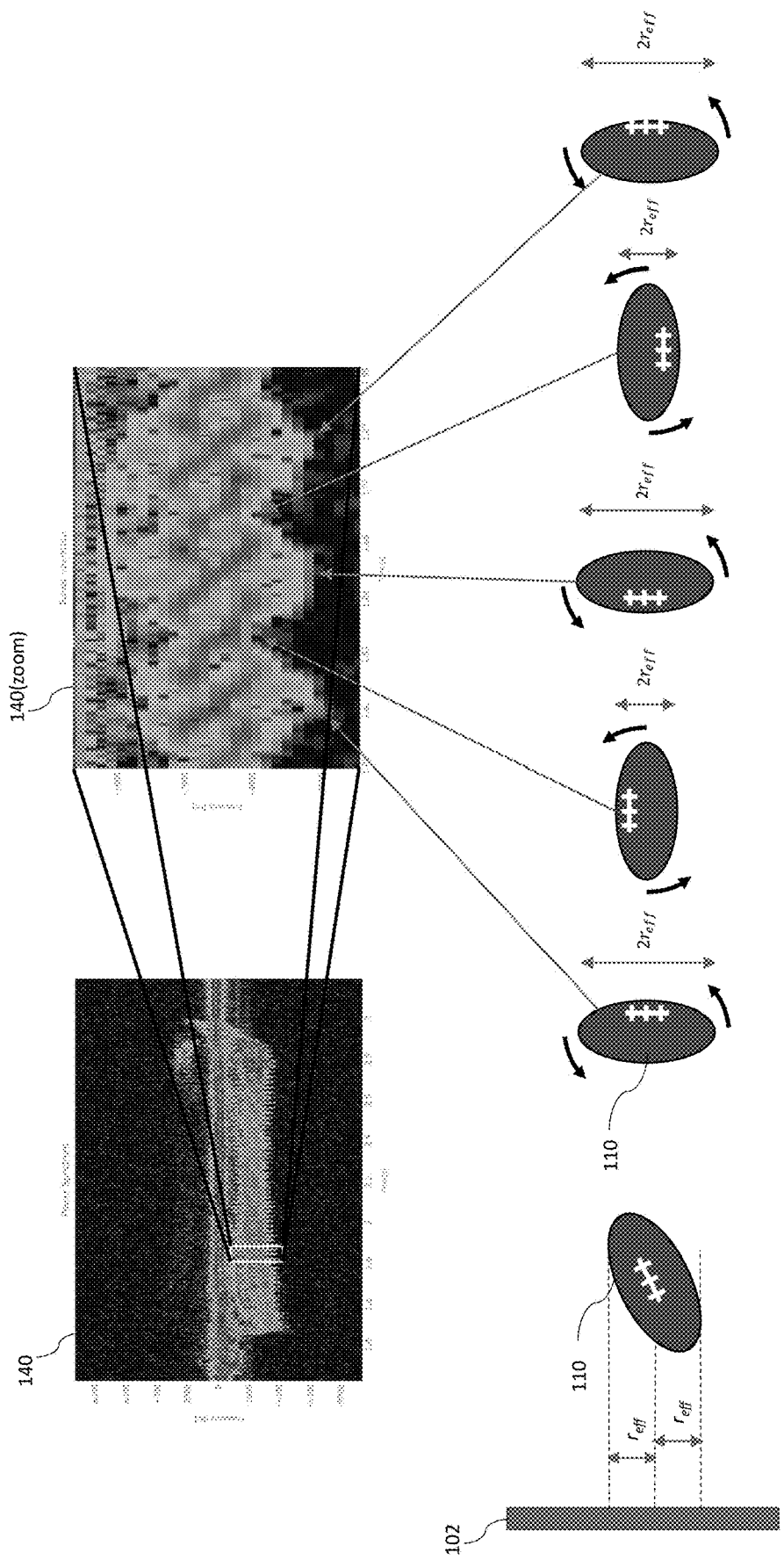
FIG. 4 shows a frequency analysis of a Doppler signal received from a toppling spheroid ball according to the first exemplary embodiment of the present invention.

FIG. 4 shows a frequency analysis of a Doppler signal received from a toppling spheroid ball 110 according to an exemplary embodiment of the present invention. Different stages of the toppling rotation are assigned to different parts of a spectrogram 140 obtained from the frequency analysis. The spectrogram consists of multiple STFTs (Short Time Fourier Transformations) adjacent in time, with the x-axis being time and the y-axis being the frequency. As discussed previously, the Doppler radar 102 transmits waves from the transmitter 104 and receives waves reflected from the ball 110 in the receiver 106, generating a corresponding signal of the toppling spheroid ball 110. Although the exemplary embodiments are described with respect to a spheroid shape, the systems and methods of these embodiments may track any non-spherical shape, or any object including an irregularity that causes the apparent size of the object, as seen from the radar, to change over the course of a rotation. The toppling of the spheroid ball 110 causes a periodic modulation of the bandwidth of the received signal, as shown in the zoomed spectrogram 140. For example, an upright orientation of the ball 110 corresponds to a frequency response more negative than a lateral orientation of the ball 110, as shown in FIG. 4. The ball 110 may also be spinning, causing an additional modulation of the signal. However, the exemplary embodiments may be performed whether or not an additional spin is present on the ball 110.

A maximum velocity seen by the radar due to toppling relative to the velocity of the center of the ball is given by: $V_{rmax}=r_{eff}\cdot\omega_{topp}$. This maximum velocity corresponds to maximum Doppler shift of: $f_{max}=2\cdot V_{rmax}/\lambda=2\cdot r_{eff}/\lambda\cdot\omega_{topp}$. Since this is a frequency modulated signal, the Carson bandwidth rule states that the ball signal has 98% of its power contained within the bandwidth, BW, given by:

$$BW = 2\cdot\left(\frac{2\cdot r_{eff}}{\lambda} + \frac{1}{2\pi}\right)\cdot\omega_{topp}$$

where $\omega_{topp}=2\pi\cdot f_{topp}$ is the angular frequency corresponding to the toppling rate $f_{topp}$, $\lambda$ is the wavelength of the transmitted radar waves and $r_{eff}$ is the effective radius of the ball as seen from the radar. As the effective radius of the ball changes during ball flight due to the toppling of the ball, the bandwidth undergoes a similar periodic change with a frequency equal to that of twice the toppling rate $f_{topp}$. Since $r_{eff}$ changes over time, so will the bandwidth BW and the maximum Doppler shift $f_{max}$ change over time. So, by detecting the frequency or time period for changes in the bandwidth BW or maximum Doppler shift $f_{max}$ over time, the toppling frequency can be determined.

Figure 7:
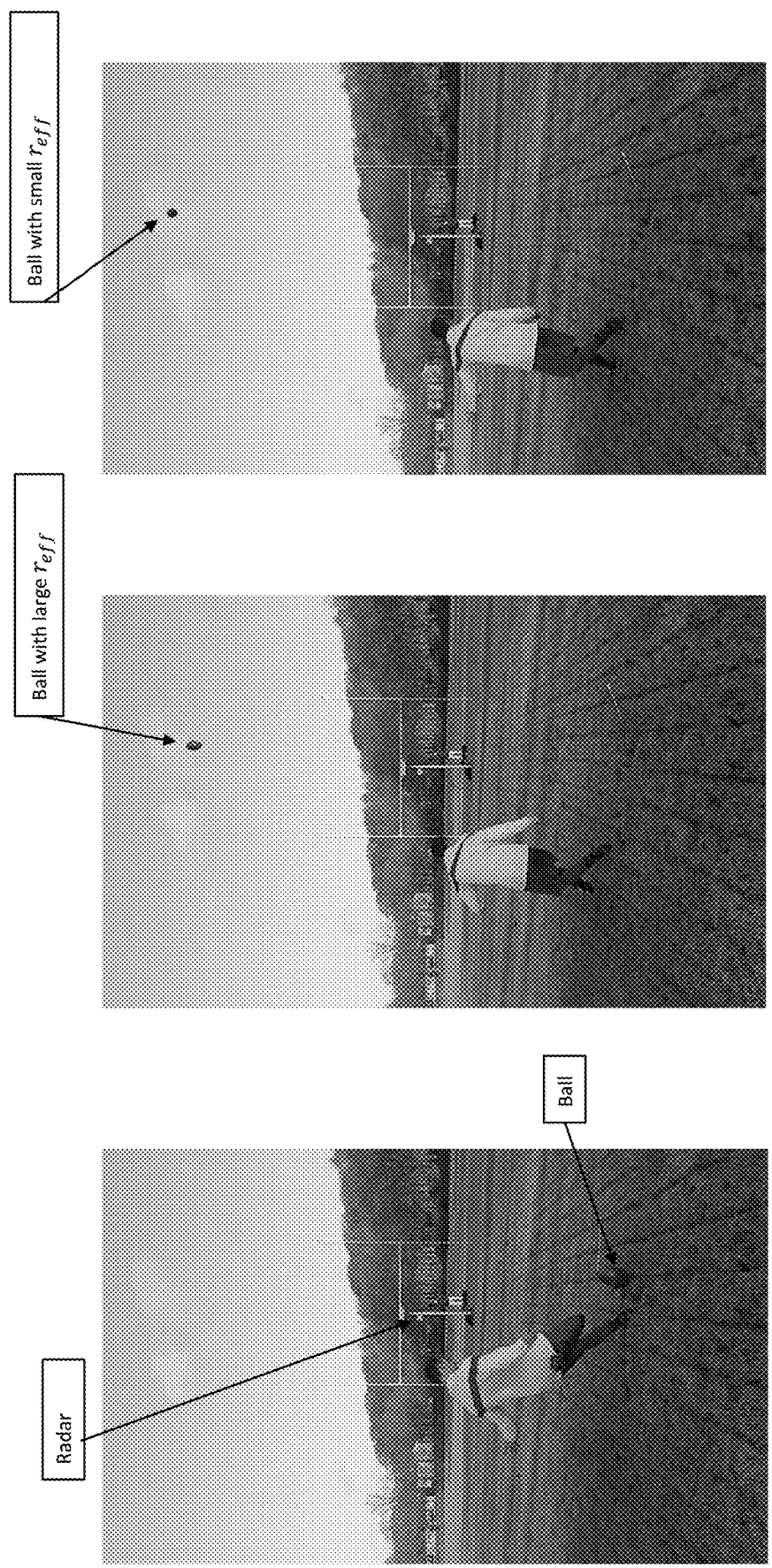
FIG. 7 shows an exemplary radar setup for determining a toppling frequency of a rotating spheroid ball according to an exemplary embodiment of the present invention.

The periodic modulation caused by toppling may be detected by only a single radar with a single receiver antenna. However, multiple radars and/or multiple receiver antennas may be added for increased accuracy. The toppling rate of the ball will be equal to half the frequency of the periodic modulation in the signal, as illustrated in FIG. 4, since the spheroid ball will appear to be the same size for every half a revolution of the ball about the toppling axis. FIG. 7 shows an exemplary radar setup for determining a toppling frequency of a rotating spheroid ball according to an exemplary embodiment of the present invention. The system of FIG. 7 includes a single radar setup, positioned facing the launch area and separated from the launch area in a target area toward which the ball is to be launched. However, the radar may be disposed in any position (e.g., on the side of a football field rather than only at the front or back of the football field). The only positional limitation is a rare scenario where the line of sight of the radar is parallel with the toppling axis of a launched football, in which case the radar would not register the periodic oscillations caused by the toppling. However even when the toppling axis of the football coincides with the line of sight of the radar at a given point during a flight, it is a near certainty that at other points during the flight the line of sight and the toppling axis will not coincide, and the radar data will register the periodic oscillations caused by the toppling.

Figure 5:
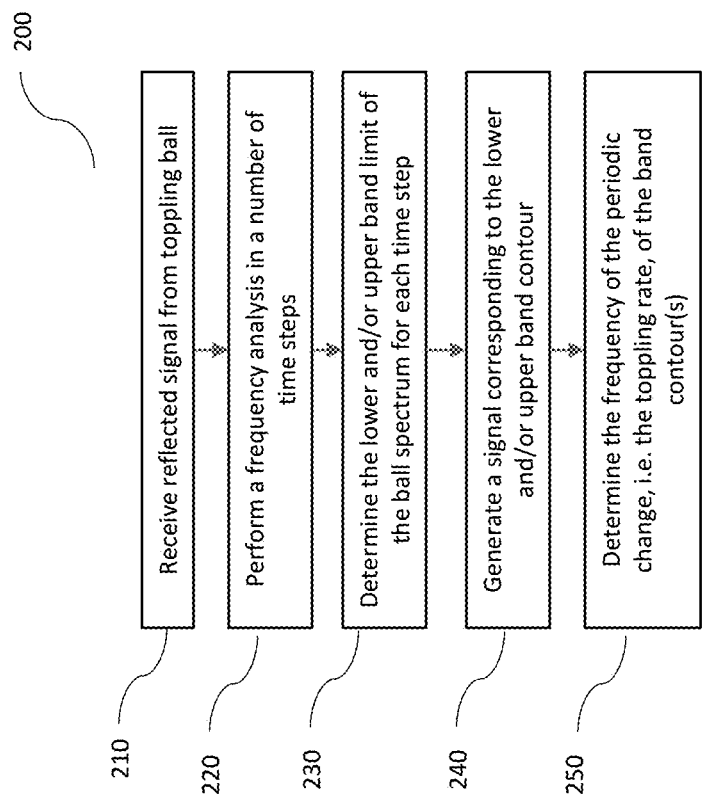
FIG. 5 shows a method for determining a toppling frequency of a rotating spheroid ball according to the first exemplary embodiment of the present invention.

FIG. 5 shows a method 200 for determining a toppling frequency of a rotating spheroid ball 110 according to an exemplary embodiment of the present invention.

Figure 6:
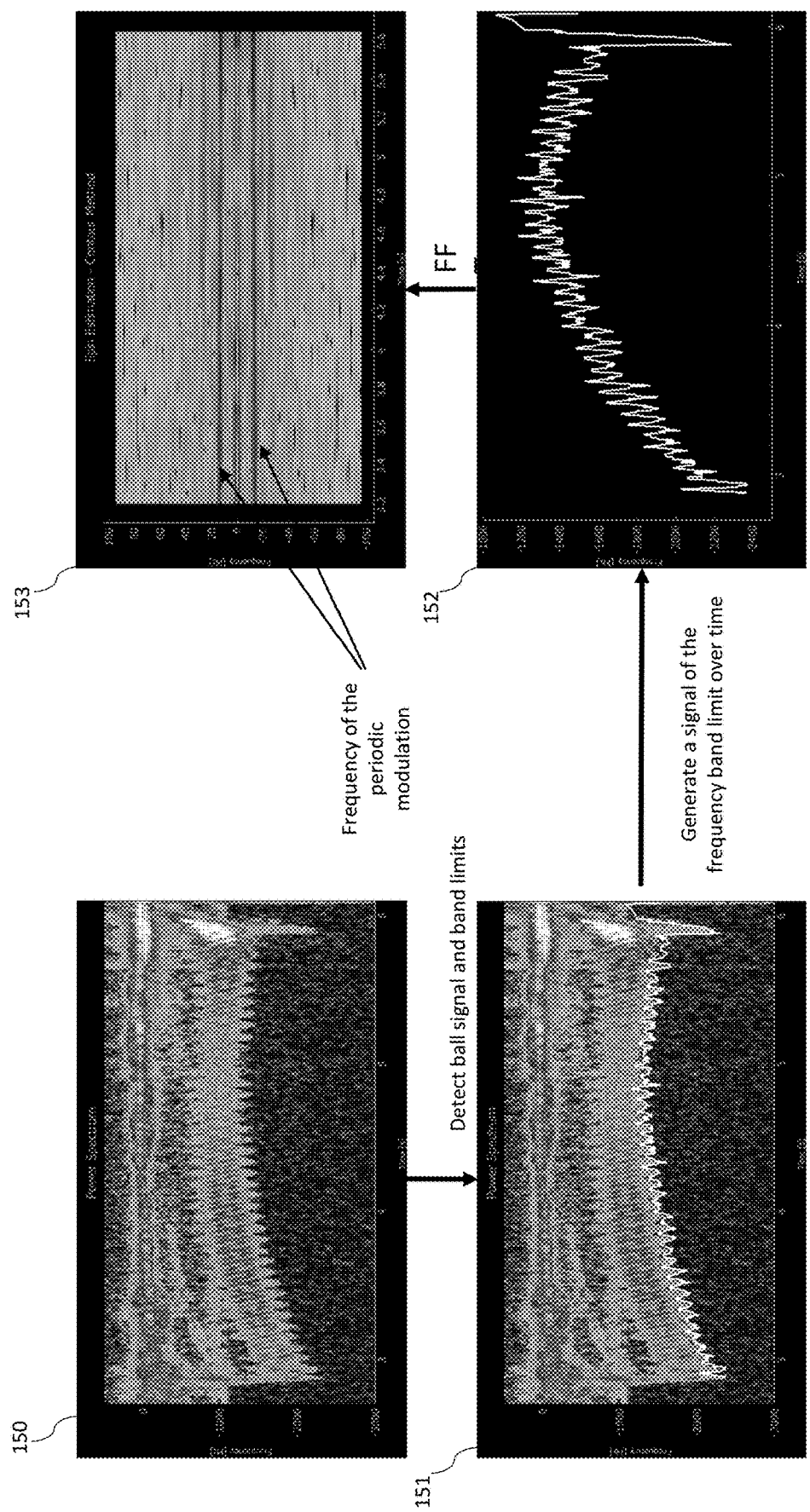
FIG. 6 shows a graphical illustration of certain steps of the method of FIG. 5.

In 210, the radar device 102 (e.g., a Doppler radar) receives reflected radar waves, in whole or in part from a toppling object. The ball has a non-spherical shape or other irregularity causing the size of ball (from the perspective of the radar device 102) to change as the orientation of the ball relative to the radar 102 changes as the ball topples. The received signal, showing a frequency response over time, such as that shown in 150 of FIG. 6, is generated from radar waves reflected from the ball and received at the receiver 106 of the radar device 102. The received signal may be seen in 150 to be periodically "envelope"-modulated with an upper bound contour, $f_{up}$, and a lower bound contour, $f_{low}$, of the bandwidth of the signal. The frequency band limit is then Fourier transformed to determine a frequency of the periodic modulation of the received signal as seen in the box 153 as will be described in more detail below.

In 220, a frequency analysis is performed on the received signal in a number of time steps. The distance between each of the time steps, according to the Nyquist sampling theorem, should preferably be less than half of a period $T_{min}$ of a maximum expected toppling frequency $f_{topp,max}$, wherein $f_{topp,max}=1/T_{min}$. The frequency analysis may be carried out using, e.g., a short-time Fourier transform (STFT), however other frequency analysis may be performed to identify a signal corresponding to the toppling object in either the frequency or time domain. The time span for each STFT should preferably be chosen as shorter than the period $T_{min}$ to avoid smearing out the time variation of the frequency bandwidth.

In 230, for each time step, the upper $f_{up}$ and/or lower $f_{low}$ frequency band limit of the spectrum corresponding to the toppling rotating ball 110 is determined. The determination of the frequency band limits may be done in various ways. In one embodiment, a power threshold above the noise floor in each frequency spectrum is defined, and the frequency at which the signal of the toppling ball first reaches below this threshold relative to the center of said signal is determined as the frequency band limit. Graph 151 of FIG. 6 shows a spectrogram of the frequency analysis with the lower frequency band limit $f_{low}$ identified.

Many things may be done to make the frequency band limits as robust as possible, such as filtering or smoothing the spectrum before the detection is performed, as is known to those skilled in the art. In addition, an adaptive threshold, considering the maximum and/or average signal from the ball and the apparent noise floor, will ensure a more robust detection of either upper $f_{up}$ and/or lower $f_{low}$ frequency band limit.

In some cases, either the upper frequency band limit or the lower frequency band limit may be difficult to detect due to other interfering signals. For example, if the method is being performed during an American football game, an interfering signal may be generated by players running on the field or by other sources. In this case, only one of the two frequency band limits may be used. In an alternative embodiment, rather than determining the upper and/or lower frequency band limits per time step, other features of the periodic signal generated from the toppling rotating ball may be used. For example, an energy of the frequency band or a power at the center ball signal trace may be detected. In the following, only the upper and lower frequency band limit embodiment is explained in detail, however the determination may utilize other metrics such as ball center power P(t), energy E(t) or other signal properties.

In 240, either a corresponding signal $f_{up}(t)$ and/or $f_{low}(t)$ is generated from the detected upper $f_{up}$ and/or lower $f_{low}$ frequency band limit for each time step $t_i$, as shown in 152 of FIG. 6.

In 250, a second frequency analysis is performed on the signal(s) $f_{up}(t)$ and/or $f_{low}(t)$ and/or BW(t) to determine the periodic modulation of the signal(s), as shown in 153 of FIG. 6.

The frequency analysis may be done by, e.g., performing a second STFT on the signal(s). The time periods for the second STFT(s) may be an entire signal span of the band limit(s). Alternatively, multiple STFTs may be used for a given one of the signals, each STFT spanning a time period sufficiently long to enable a determination of the toppling rate with sufficient accuracy, as illustrated in FIG. 6. A time span shorter than the entire available signal may be preferred, since the toppling rate may change over time due to air resistance. Obviously, one can take into account a predetermined change in toppling frequency over time whereby longer time spans are possible, ultimately using the entire available signal for one STFT.

The second frequency analysis provides a frequency of the periodic change, or period of modulation corresponding to the toppling rate, in the band contour(s). Other means exist for determining a period of modulation corresponding to the toppling rate from the corresponding signal(s) (like $f_{up}(t)$, $f_{low}(t)$, BW(t), S(t)). For example, one alternative method comprises performing an auto-correlation in the time domain and detecting correlation peaks, and other standard methods exist for determining the major frequency components in a time signal, as is known by a person skilled in the art. Knowledge about an expected toppling rate may be used to improve the likelihood of identifying the correct toppling frequency. The expected toppling rate may be predetermined or derived from other measurements such as ball speed, trajectory, etc.

Figure 8:
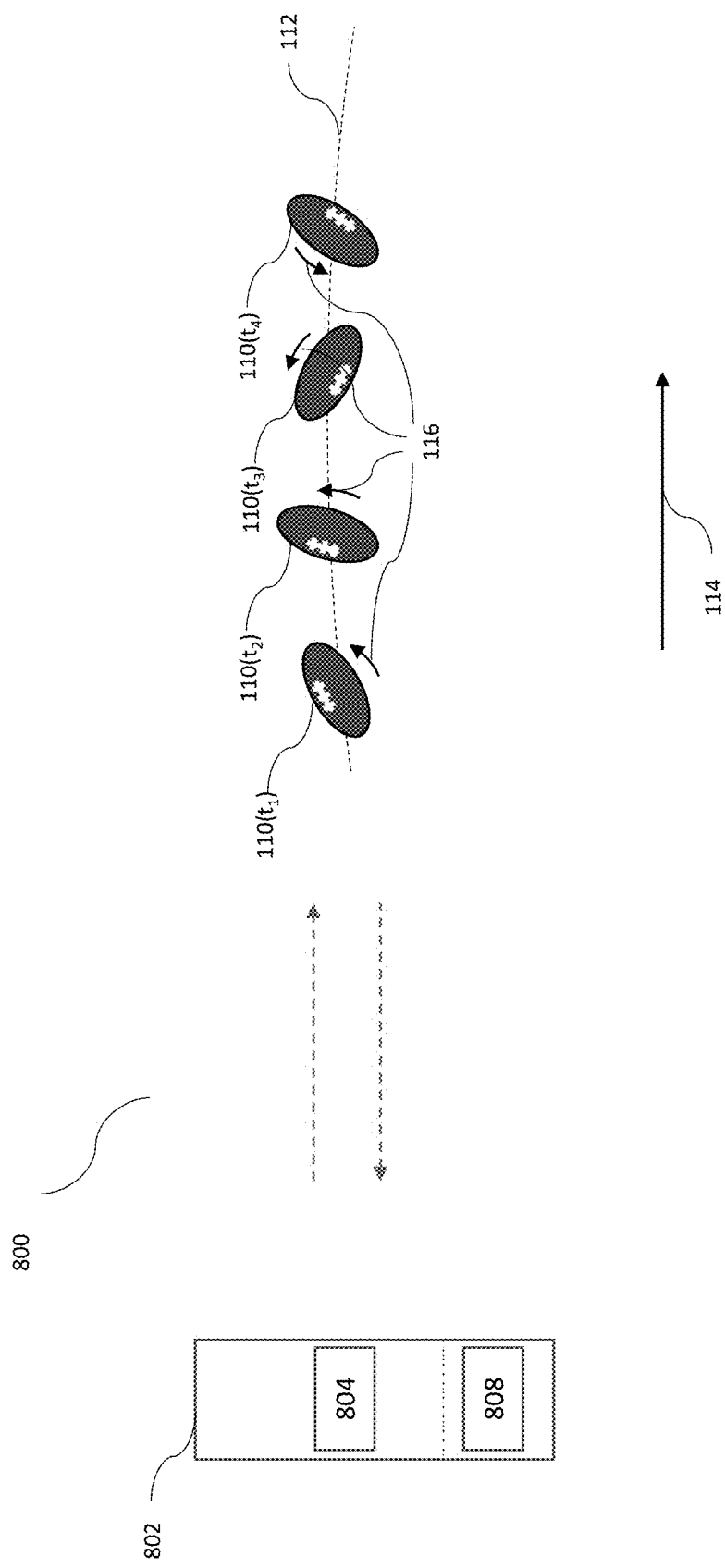
FIG. 8 shows an imaging system for determining a toppling frequency of a rotating spheroid ball according to a second exemplary embodiment of the present invention.

In a second exemplary embodiment, an imager is used instead of a radar or lidar. FIG. 8 shows an imaging system 800 for determining a toppling frequency of a rotating spheroid ball 110 according to a second exemplary embodiment of the present invention. The system 800 includes an imaging device 802 aimed in a direction 114 encompassing in its field of view an area into which a spheroid ball 110 is to be projected toward during at least a part of its flight along a flight path 112. The direction 114 may be toward a target area at which the spheroid ball 110 is being aimed. The imaging device 802, in this exemplary embodiment, includes a single camera 804. However, the imaging device 802 may comprise multiple cameras for increasing the accuracy of the toppling frequency determination. Further cameras may be an integral part of the imaging system 802 or may be disposed at remote vantage points. The imaging device 802 further includes a processor 808 which may be an integral part of the imaging system or may be a separate processor connected to the imaging device 802 via, for example, a wired or wireless connection, as would be understood by those skilled in the art. In a further embodiment, the processor 808 may include a computer associated with the imaging device 802.

Figure 9:
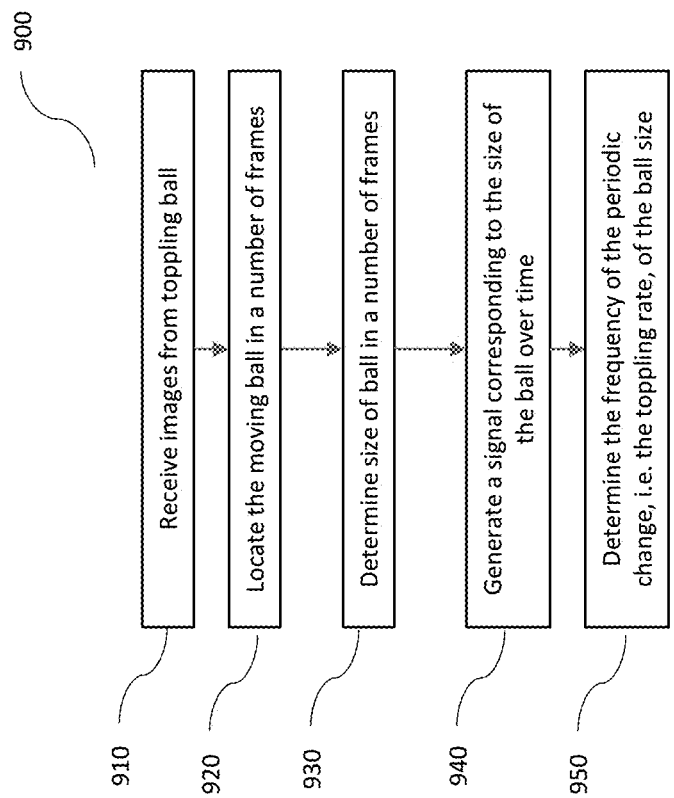
FIG. 9 shows a method for determining a toppling frequency of a rotating spheroid ball according to the second exemplary embodiment of the present invention.

FIG. 9 shows a method 900 for determining a toppling frequency of a rotating spheroid ball according to the second exemplary embodiment of the present invention. Whereas in the first embodiment a periodically modulating signal is generated from Doppler frequency data, in the second embodiment a periodically modulating signal is generated from data corresponding to the size in images of the rotating ball.

In 910, the imaging device 802 captures a plurality of frames including a toppling object, e.g., the spheroid ball 110. In 920, the spheroid ball 110 is located in the plurality of frames. To identify the launched ball, the computer may first remove background elements from the captured frames (i.e., elements that are not moving from frame to frame) and look only at changes between successive frames, i.e., motion. The computer may then analyze the shapes of the moving image elements to identify a ball. There may be multiple moving objects in the images other than the ball, e.g., players, spectators, trees, etc. The computer may, for example, have a predefined ball shape and size stored in a memory with which it may identify the ball in the images.

In 930, a size of the spheroid ball 110 is determined for each of the frames. The size may be measured in various ways known in the art, e.g., determining a number of pixels included in the image of the ball. In 940, a signal representing the apparent size of the ball over time, as measured in the frames, is generated by the processor 808. The generated signal S(t) representing the size of the ball in the images over time will have a periodic component corresponding to the toppling frequency. As long as the frame rate of the imager and the ball size determination occurs according to the Nyquist criteria of at least twice for every half of the toppling frequency (i.e., a frame rate and size detection occurring at least as often as the toppling frequency), a reliable determination of the toppling frequency may be made.

In 950, a frequency analysis is done by performing a STFT on the signal S(t), i.e. the apparent size of the ball in the images over time is analyzed to determine the periodic modulation of the signal. Step 950 may be substantially similar to step 550 of method 500. As mentioned for the first embodiment, the second frequency analysis might be performed in either the frequency domain or time domain, such as performing an auto-correlation of the time signal S(t).

The methods and signals described above can of course be combined, whereby a more accurate and robust determination can be achieved, but this is not required. For example, the signal from a pulse type radar or lidar may be used to generate a signal corresponding to a change in the apparent size of the non-spherical ball. In this example, the signal strength, center Doppler frequency shift and/or corresponding phase information of the received signal is used to generate the signal corresponding to the change in the apparent size of the non-spherical ball.

The methods described above can be used to determine toppling alone, or may be implemented in a system capable of determining other relevant parameters such as ball speed, launch angle, etc. to gain additional insight into the ball flight. Any such system will also be able to output the toppling rate, which could be used but is not limited to usage in data visualization such as on a mobile application or in a television broadcast.

It will be appreciated by those skilled in the art that changes may be made to the embodiments described above without departing from the inventive concept thereof. It should further be appreciated that structural features and methods associated with one of the embodiments can be incorporated into other embodiments. It is understood, therefore, that this invention is not limited to the particular embodiment disclosed, but rather modifications are also covered within the scope of the present invention as defined by the appended claims.

The invention claimed is:

1. A method, comprising:
   aiming a radar in a direction such that a field of view of the radar includes an area into which a non-spherical object is to be projected;
   capturing, by the radar, radar data of the object;
   detecting, by a processor, in the radar data, oscillations corresponding to rotation of the object about an axis that is not an axis of symmetry of the object; and
   determining, by the processor, a frequency of the rotation of the object about the axis based on the detected oscillations.

2. The method of claim 1, further comprising:
   performing, on the radar data, a first frequency analysis in a plurality of time steps; and
   generating a spectrogram based on the first frequency analysis.

3. The method of claim 2, wherein the first frequency analysis comprises a plurality of short time Fourier transformations (STFTs).

4. The method of claim 3, further comprising:
   determining at least one of an upper limit, a lower limit or a bandwidth of at least a portion of the spectrogram corresponding to the object.

5. The method of claim 4, wherein the upper limit and the lower limit are determined by defining a power threshold above a noise floor in the spectrogram.

6. The method of claim 4, further comprising:
   generating a signal from the determined at least one of the upper limit, the lower limit or the bandwidth.

7. The method of claim 6, further comprising:
   performing, on the generated signal, a second frequency analysis.

8. The method of claim 1, wherein the radar comprises a continuous wave (CW) Doppler radar emitting microwaves at a frequency between 5-125 GHz.

9. The method of claim 7, further comprising:
   determining a periodic modulation of the generated signal based on the second frequency analysis,
   wherein the frequency of the rotation of the object corresponds to the periodic modulation of the generated signal.

10. A system, comprising:
    a radar aimed in a direction such that a field of view of the radar includes an area into which a non-spherical object is to be projected, the radar configured to capture radar data of the non-spherical object; and
    a processor configured to detect, in the radar data, oscillations corresponding to rotation of the object about an axis that is not an axis of symmetry of the object and determine a frequency of the rotation of the object about the axis based on the detected oscillations.

11. The system of claim 10, wherein the processor performs, on the radar data, a first frequency analysis in a plurality of time steps and generates a spectrogram based on the first frequency analysis.

12. The system of claim 11, wherein the first frequency analysis comprises a plurality of short time Fourier transformations (STFTs).

13. The system of claim 12, wherein the processor determines at least one of an upper limit, a lower limit and a bandwidth of at least a portion of the spectrogram corresponding to the object.

14. The system of claim 13, wherein the upper limit and the lower limit are determined by defining a power threshold above a noise floor in the spectrogram.

15. The system of claim 13, wherein the processor generates a signal from one of the determined upper limit, the determined lower limit and the bandwidth.

16. The system of claim 15, wherein the processor performs, on the generated signal, a second frequency analysis.

17. The system of claim 16, wherein the processor determines a periodic modulation of the generated signal based on the second frequency analysis, wherein the frequency of the rotation of the object corresponds to the periodic modulation of the generated signal.

18. The system of claim 10, wherein the radar comprises a continuous wave (CW) Doppler radar emitting microwaves at a frequency between 5-125 GHz.

* * * * *